No. 735,060. PATENTED AUG. 4, 1903.
H. BOUSSEMAERE.
COUPLING FOR STRAIGHT EDGES.
APPLICATION FILED MAY 4, 1903.
NO MODEL. 3 SHEETS—SHEET 1.
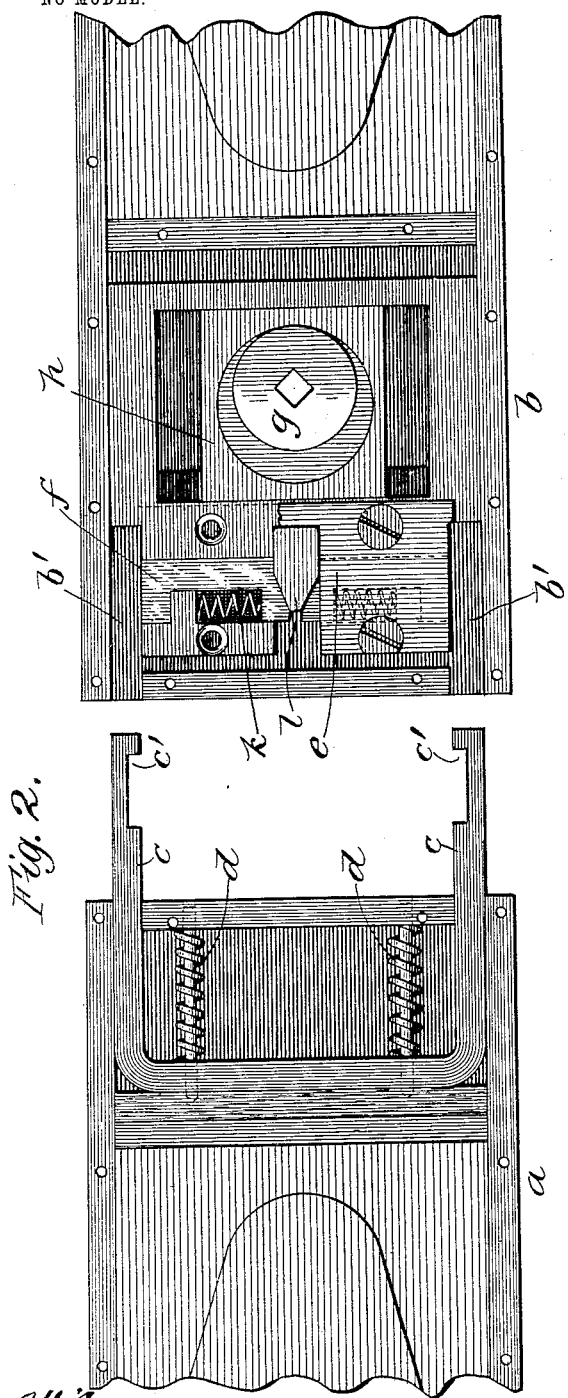
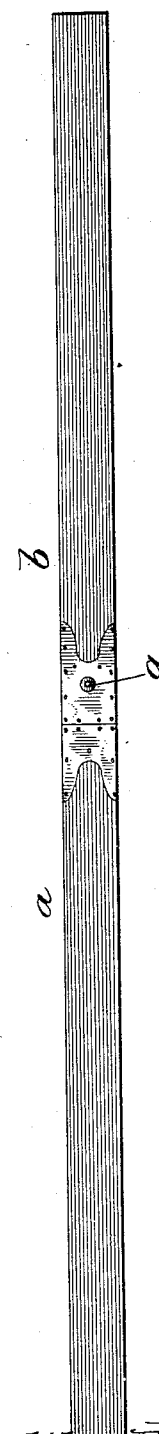
Witnesses:
O. M. Hermid
Irving Mac Donald.
Inventor:
Hyppolite Boussemaere
By Barton & Tanner,
Attorneys.

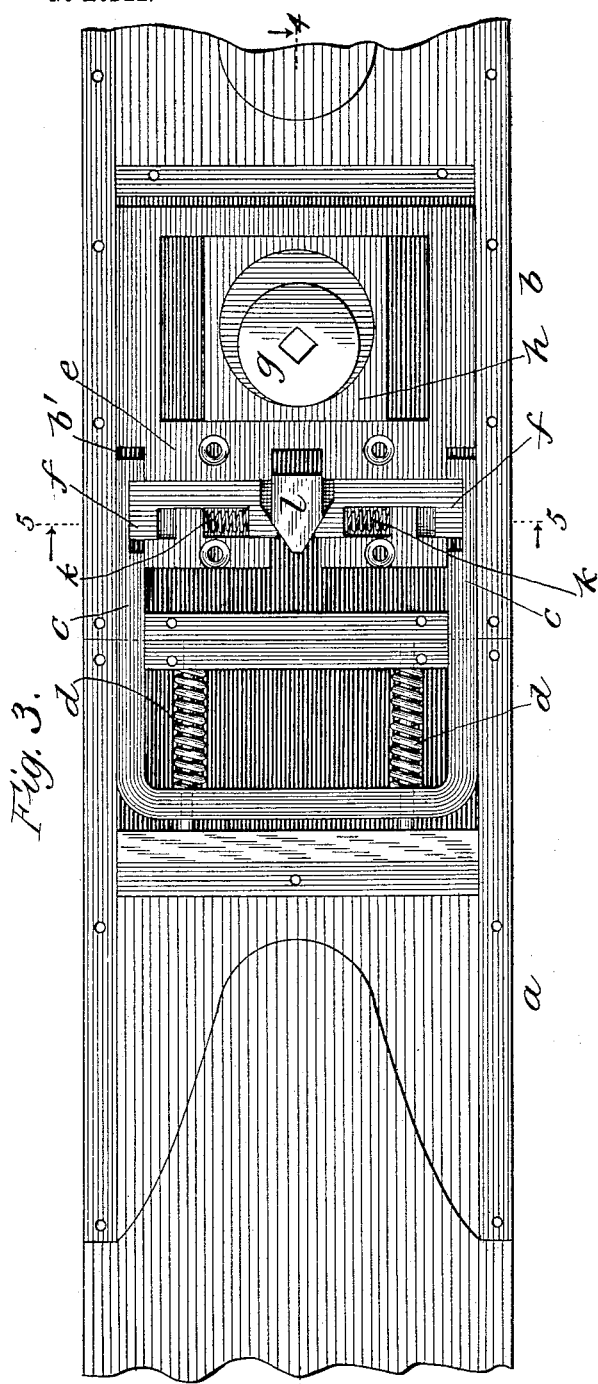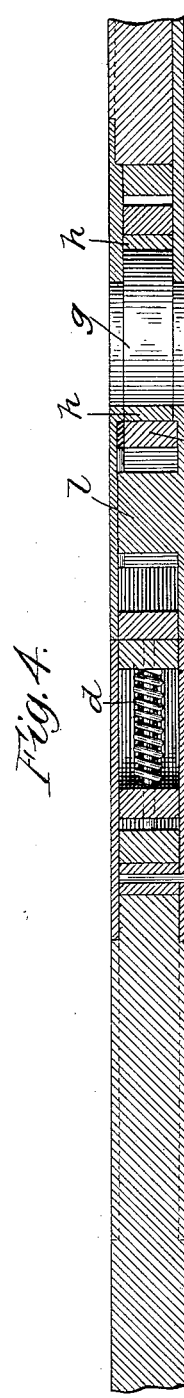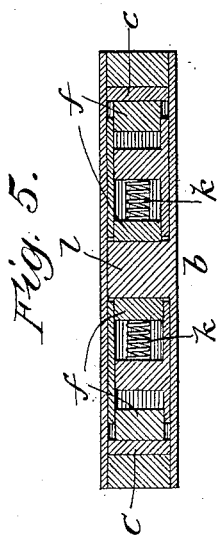

No. 735,060. PATENTED AUG. 4, 1903.
H. BOUSSEMAERE.
COUPLING FOR STRAIGHT EDGES.
APPLICATION FILED MAY 4, 1903.
NO MODEL. 3 SHEETS—SHEET 3.
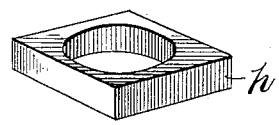
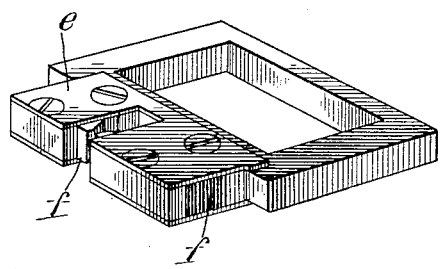
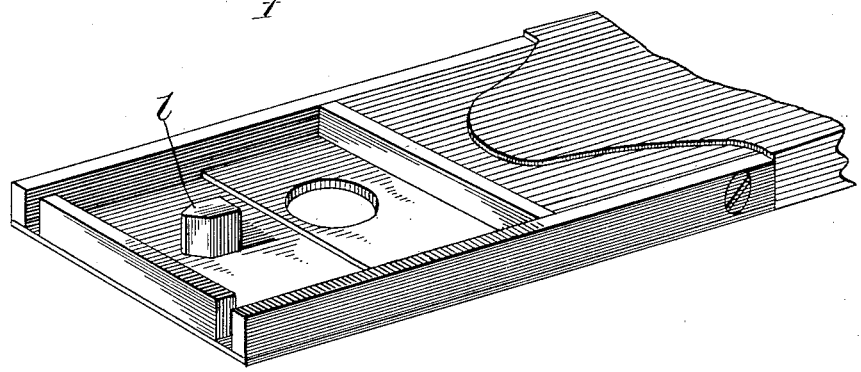
Witnesses:
O. M. Wennick
Irving MacDonald
Inventor:
Hyppolite Boussemaere,
By Barton & Danner
Attorneys.

No. 735,060. Patented August 4, 1903.

UNITED STATES PATENT OFFICE.

HYPPOLITE BOUSSEMAERE, OF CHICAGO, ILLINOIS.

COUPLING FOR STRAIGHT-EDGES.

SPECIFICATION forming part of Letters Patent No. 735,060, dated August 4, 1903.

Application filed May 4, 1903. Serial No. 155,512. (No model.)

*To all whom it may concern:*

Be it known that I, HYPPOLITE BOUSSEMAERE, a citizen of the United States, residing at Chicago, in the county of Cook and State of Illinois, have invented a certain new and useful Improvement in Couplings for Straight-Edges, of which the following is a full, clear, concise, and exact description.

My invention relates to a mechanical coupling; and its object is in general to provide improved means whereby two bars or members may be easily and quickly joined together end to end, so as to form, in effect, a single solid piece, but in such a manner that they may be quickly uncoupled when desired.

My invention is applicable more particularly to straight-edges such as are used by paper-hangers. These straight-edges are usually about seven feet long, and are consequently very unhandy to carry about. They have, however, usually been made in one piece, because of the difficulty in making a joint by which two pieces could be firmly held together end to end in exact alinement. It has been my object in particular to provide such a joint or coupling, and I will describe the same by reference to the accompanying drawings, in which—

Figure 1 illustrates a straight-edge made in two parts or members joined together end to end in accordance with my invention. Fig. 2 shows the two members of the coupling in position to be joined together, the outer plates being removed to disclose the mechanism and one of the inner plates being shown partially broken away for the same purpose. Fig. 3 is a view similar to Fig. 2, but showing the two members coupled and locked together. The plate covering the locking-bolts, which was shown partially broken away in Fig. 2, is entirely removed in Fig. 3. Fig. 4 is a longitudinal sectional view on line 4 4 of Fig. 3. Fig. 5 is a cross-sectional view on line 5 5 of Fig. 3; and Fig. 6 illustrates the several disassembled parts of one of the members of the coupling, these parts being shown one above the other to indicate their relations to one another.

The same letters of reference are used to designate the same parts wherever they are shown.

The straight-edge shown in Fig. 1 is made in two parts or members $a$ $b$, which may be of wood, provided with the coupling of my invention by which the two sections may be firmly joined together end to end, as shown. The member $a$ is provided with two projecting tongues $c$ $c$ at its end, which are adapted to enter sockets $b'$ $b'$, respectively, in the member $b$ when the two members are brought together end to end. The inner faces of the tongues $c$ $c$ are recessed at $c'$ $c'$, as shown, to provide shoulders against which the locking-bolts of the other member may engage. The tongues $c$ $c$ are preferably made in one piece—that is, they are the projecting ends of a U-shaped bar which is mounted snugly in the end of the member $a$ in such a manner as to slide longitudinally therein to some extent without turning angularly. Strong springs $d$ $d$ may be provided to hold the U-shaped bar securely against its seat. The tongues $c$ $c$ are thus capable of being slightly extended if the pull on them is sufficiently strong to overcome the tension of springs $d$ $d$.

The locking-slide $e$ is arranged to slide to and fro in the member $b$ of the coupling, the forward portion of said lock occupying the space between the sockets $b'$ $b'$ in position to fit between the inserted tongues $c$ $c$ of the other member. Said locking-slide $e$ carries locking-bolts $f f$, which are arranged to slide crosswise therein. Normally said bolts are held flush with the edges of the locking-slide, so that the tongues $c$ $c$ may be inserted in the sockets until the recesses $c'$ $c'$ register with the ends of the bolts $f f$. When the bolts $f f$ are advanced, they enter the recesses $c'$ $c'$ of the inserted tongues to lock said tongues against withdrawal. I also provide means whereby the entire locking-slide $e$ may be retracted within the member $b$ to pull the tongues farther into the sockets $b'$ $b'$ against the tension of springs $d$ $d$, whereby the two members of the coupling are held together. The part $e$ is arranged to be slid to and fro in the framework of the member $b$ by means of a rotatable cam or eccentric $g$, which is mounted to rotate in said framework, the eccentric portion of the cam-piece being arranged to engage a block $h$, mounted to slide in the frame of the locking-slide $e$. The cam-piece $g$ is provided with an angular hole in its axis, into which a suitable key may be inserted to turn the cam and operate the lock. The bolts $ff$ of the locking-slide are normally held retracted by springs $k\,k$, as shown in Fig. 2. The rear ends of said bolts, however, are provided with beveled edges, which are adapted to slide on the inclined surfaces of a wedge-shaped lug $l$, carried by the framework of the member $b$. When the cam-piece $g$ is rotated to retract the slide $e$, the beveled edges of the bolts $ff$, carried by said slide, are engaged by the wedge-surfaces of the lug $l$, whereby the bolts are forced apart and thrust outwardly into the sockets $b'\,b'$—that is, into the recesses $c'\,c'$ of the tongues $c\,c$—when said tongues are inserted.

Fig. 2 shows the two members in position to be coupled, and Fig. 3 shows them locked together, the eccentric having been turned to retract the locking-slide $e$. The parts should be constructed to fit closely to one another, so that there may be no undue lost motion.

It will be appreciated that by means of the coupling above described the two members $a\,b$ may be quickly and securely fastened together end to end in perfect alinement by bringing them together with the eccentric in the position shown in Fig. 2 and then turning the eccentric to draw the two parts tightly together. It will be understood that the form of the parts may be modified without departing from the spirit of my invention.

I claim—

1. In a mechanical coupling, the combination with the two members adapted to abut against each other end to end, of a recessed locking-tongue carried by one member, the other member having a socket adapted to receive said tongue, a locking-slide arranged to move longitudinally in the socketed member, a bolt sliding crosswise in said locking-slide, adapted to engage the recessed portion of the locking-tongue of the other member, means for advancing the bolt to engage the tongue as the locking-slide is retracted, and a cam adapted to reciprocate said locking-slide.

2. The combination with two bars $a\,b$ adapted to abut against each other end to end, of a pair of recessed locking-tongues $c\,c$ carried by one member, the other member having sockets adapted to receive said tongues, a locking-slide arranged to slide longitudinally in the socketed member, said locking-slide carrying bolts $ff$ arranged to slide crosswise in the locking-slide in position to engage the recessed portions of the locking-tongues of the other member, a wedge adapted to engage said bolts to advance the same as the locking-slide is retracted, springs $k\,k$ for retracting said bolts, and a rotating cam-piece $g$ adapted to reciprocate said locking-slide.

3. In a mechanical coupling, the combination with the two members adapted to abut against each other end to end, of a recessed locking-tongue carried by one member and adapted to be extended longitudinally therein, a spring tending to hold said tongue in its retracted position, the other member having a socket adapted to receive said tongue, a locking-slide in the socketed member having a part adapted to engage said locking-tongue, and a cam adapted to retract said locking-slide to draw said tongue farther into the socket against the tension of its spring.

4. The combination with the two members $a\,b$, of a U-shaped bar mounted in one of said members having recessed ends $c\,c$ projecting from the end of said member to form locking-tongues, said bar being adapted to slide longitudinally, whereby said tongues may be extended, a spring arranged to hold said bar yieldingly in a retracted position, the other member having sockets adapted to receive said locking-tongues, a locking-slide arranged to move longitudinally in the socketed member, said locking-slide carrying bolts adapted to engage the recessed portions of the locking-tongues of the other member, means for advancing the bolts to engage said tongues as the locking-slide is retracted, and a rotating cam-piece $g$ adapted to reciprocate said locking-slide, whereby said locking-tongues are drawn into the sockets against the tension of said spring and the two members tightly held together.

In witness whereof I hereunto subscribe my name this 2d day of May, A. D. 1903.

HYPPOLITE BOUSSEMAERE.

Witnesses:
GEORGE P. BARTON,
FRANK H. WARREN.